United States Patent

Calle et al.

[11] Patent Number: 5,896,658
[45] Date of Patent: Apr. 27, 1999

[54] METHOD OF MANUFACTURING A HOLLOW BLADE FOR A TURBOMACHINE

[75] Inventors: Gilles Michel Georges Louis Calle, Chelles; Gilles Charles Klein, Mery/Oise, both of France

[73] Assignee: Societe Nationale d'etude et de Construction de Moteurs d'Aviation "Snecma", Paris, France

[21] Appl. No.: 08/951,292

[22] Filed: Oct. 16, 1997

[30] Foreign Application Priority Data

Oct. 16, 1996 [FR] France ................................. 96 12601

[51] Int. Cl.$^6$ ........................................... B23P 15/00
[52] U.S. Cl. ........................................ 29/889.72; 29/889.7
[58] Field of Search ........................ 29/889.7, 889.72; 228/157

[56] References Cited

U.S. PATENT DOCUMENTS

| | | | |
|---|---|---|---|
| 5,083,371 | 1/1992 | Leibfreid et al. | 29/889.72 |
| 5,323,536 | 6/1994 | Fowler et al. | 29/889.72 |
| 5,419,040 | 5/1995 | Weisse et al. | 29/889.72 |
| 5,469,618 | 11/1995 | Le Mands et al. | 29/889.72 |
| 5,479,705 | 1/1996 | Fowler et al. | 29/889.72 |
| 5,581,882 | 12/1996 | Fowler et al. | 29/889.72 |
| 5,636,440 | 6/1997 | Bichon et al. . | |

FOREIGN PATENT DOCUMENTS

| | | |
|---|---|---|
| 0 468 221 | 1/1992 | European Pat. Off. . |
| 0 507 067 | 10/1992 | European Pat. Off. . |
| 0 568 201 | 11/1993 | European Pat. Off. . |
| 0 700 738 | 3/1996 | European Pat. Off. . |
| 2 739 045 | 3/1997 | France . |
| 2 280 867 | 2/1995 | United Kingdom . |

*Primary Examiner*—I Cuda
*Attorney, Agent, or Firm*—Oblon, Spivak, McClelland, Maier & Neustadt, P.C.

[57] ABSTRACT

In a method of manufacturing a hollow blade for a turbomachine in which a plurality of primary sheet-like parts having anti-diffusion coatings in predefined areas are assembled face to face and diffusion welded together before being deformed to shape by pressurized gas and superplastic forming. The assembly, before being diffusion welded together, is subjected to a preheating treatment in an oven to remove the binder from the anti-diffusion coatings, and then, without moving the assembly, the interior of the assembly is evacuated while simultaneously progressively increasing the temperature at a rate V to a value T to produce a permanent plastic deformation of the parts, the interior of the assembly then being maintained in vacuo at the temperature T while an isostatic pressure is applied to the exterior of the assembly so as to produce a compacting of the anti-diffusion material and a prewelding of the facing areas which are not coated with the anti-diffusion material.

4 Claims, 1 Drawing Sheet

METHOD OF MANUFACTURING A HOLLOW BLADE FOR A TURBOMACHINE

BACKGROUND OF THE INVENTION

1. Field of the Invention

The invention relates to a method of manufacturing a hollow blade for a turbomachine in which a plurality of primary sheet-like parts are assembled face to face and diffusion welded together in predetermined areas before being deformed to shape by pressurized gas and superplastic forming.

2. Discussion of the Background

The advantages of using large-chord blades in turbomachines are particularly apparent in the case of the fan rotor blades of bypass jet engines. Such blades must withstand severe operating conditions and, in particular, must have mechanical properties enabling them to withstand satisfactorily vibrations and impacts from foreign bodies. Also, the requirement for adequate blade tip speeds has stimulated efforts to reduce the weight of the blades, which aim can be achieved in particular by the use of hollow blades.

EP-A-0700738 describes a process for the manufacture of a hollow turbomachine blade, particularly a large-chord blade for a fan rotor, which process generally comprises the following steps:

a) defining the flat form of the primary sheet-like or substantially planar parts of the blade using CADCAM and digital simulation techniques;

b) die-forging the primary parts of the blade in a press;

c) machining the primary parts;

d) depositing diffusion barriers on at least one of the primary parts according to a predefined pattern;

e) assembling the primary parts and hot diffusion welding them together under isostatic pressure;

f) pressurized gas inflation and superplastic forming of the welded assembly; and, g) final machining of the assembly.

French Patent Application No. 9607329 describes such a process in which the assembly can be shaped by a twisting operation without risk of causing buckling undulations along the neutral fiber by carrying out a preliminary step of elongating the fibers distributed on either side of the neutral fibre.

French Patent No. 2739045 and French Patent Application No. 9610194 describe such a process in which, in view of the compaction of the primary parts in the regions of the diffusion barriers during the welding step, an operation to unstick the primary parts in these regions is carried out before performance of step (f). The unsticking step is achieved by hot forming a feed duct in a zone where the assembly has communicating passages between cavities. The cavities are therefore fed evenly and simultaneously, and the deformation rates can be controlled right from the start of the inflation cycle of step (f), thus ensuring the regularity and shape of the stiffeners. This results in a process with the following general operating sequence of steps:

a) defining the flat form of the primary sheet-like parts of the blade by CADCAM and digital simulation techniques;

b) die-forging the primary parts of the blade in a press;

c) machining the primary parts;

d) depositing diffusion barriers on at least one of the primary parts according to a predefined pattern;

e) assembling the primary parts and hot diffusion welding them together under isostatic pressure;

f) hot shaping the welded assembly by elongation of the fibres;

g) hot forming a feed duct followed by unsticking of the primary parts in the regions coated with an anti-diffusion material;

h) pressurized gas inflation and superplastic forming of the assembly; and, i) final machining of the assembly.

In step (d) of this process it is known to deposit the anti-diffusion material by a silk-screen process. Embodiments are described in detail in French Patent Application No. 2739045. FIG. 1 illustrates a stage in the process when used to manufacture a hollow blade for a turbomachine fan from three primary parts defining an extrados skin 11, a central plate 12 and an intrados skin 13, at least two surfaces having been coated with an anti-diffusion material following a predefined pattern. In the stage shown in FIG. 2 the primary parts 11, 12, 13 have been assembled to form an assembly 14 using two centring pins 15, 16, and the assembly has been welded around its periphery in a neutral atmosphere in order not to contaminate the surfaces of the part. Before complete closure of the assembly by the peripheral welding, one or more tubes, such as 17 and 18, are added so as to communicate with the inner regions coated with the anti-diffusion material. At this stage the assembly is ready for diffusion welding which, in the case of a TA6V or TAD4E type titanium alloy, is performed at a temperature above 880° C. However, as described in the aforesaid French Patent Application NO. 2739045, it is often necessary to carry out a preheating, treatment of the anti-diffusion material before the diffusion-welding step because the organic binders which are included in anti-diffusion materials, and which are needed to carry the material and ensure mechanical retention of the deposit on the coated surfaces, must be removed in order to ensure intimate contact between the surfaces and in order not to pollute the contacting surfaces when the temperature rises to above 500° C. for diffusion welding. The binders are completely eliminated by thermal breakdown between 200 and 400° C. and the gases evolved are removed by a flow of an inert gas, for example argon, or by pumping. During this operation the particles of the anti-diffusion material become very mobile since the mechanical bonds provided by the binder are completely broken down, and the assembly therefore requires very careful handling to ensure that there is no migration of particles to the uncoated areas.

SUMMARY OF THE INVENTION

It is an object of the invention to overcome the disadvantage mentioned above and to provide a method in which the peripherally welded assembly can be handled after breakdown and complete removal of the binder contained in the anti-diffusion material without any risk of particles migrating into areas which will subsequently be welded.

To this end, in a method of manufacturing a hollow turbomachine blade as hereinbefore described, the invention proposes an additional step after the preheating treatment of the anti-diffusion material to produce breakdown and complete removal of the binder contained in the anti-diffusion material and before carrying out the isostatic pressure diffusion welding of the assembly, said additional step being performed without moving the assembly after the preheating treatment and comprising exhausting the interior of the assembly while simultaneously progressively heating it at a rate V to a temperature T adapted to produce a permanent plastic deformation of the parts, and then maintaining the interior of the assembly in vacuo at the temperature T while applying an isostatic pressure to the exterior of the assembly so as to achieve a compacting of the anti-diffusion material and a prewelding of the facing areas which are not coated with the anti-diffusion material.

Preferably, the interior of the assembly is maintained at a vacuum between 1 Pa and $10^{-4}$ Pa while an isostatic pressure between $10^5$ Pa and $5 \times 10^5$ Pa is applied to the exterior of the assembly, these conditions being maintained for 1 hour.

Preferably, the oven containing the assembly and the interior of the assembly itself are exhausted simultaneously.

Other preferred features and advantages of the invention will become apparent from the following description of a preferred embodiment of the invention with reference to the accompanying drawings.

DESCRIPTION OF THE PREFERRED EMBODIMENT

Figure 1:
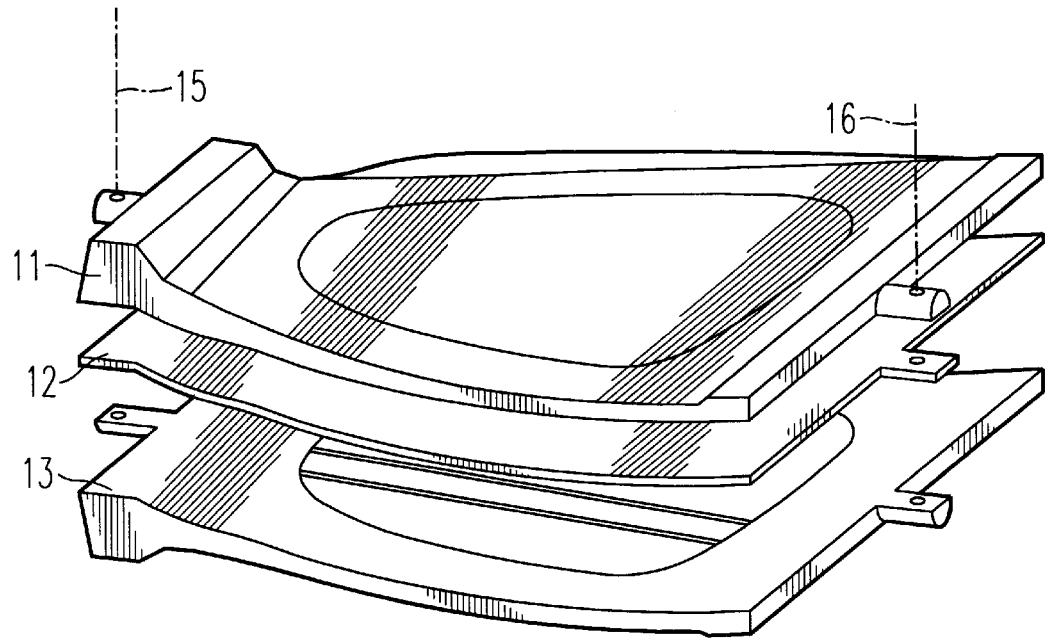
FIG. 1 is a perspective view of the primary parts of a hollow blade prior to assembly of the parts in one embodiment of the method of manufacture according to the invention.

FIG. 1 shows an intermediate stage of a method of manufacturing a large-chord rotor blade for a turbomachine fan from a primary extrados part 11, a central sheet metal part 12 and a primary intrados part 13. As is known at this stage, at least two surfaces of the primary parts are coated with an anti-diffusion material in a predefined pattern, such as in a known manner by a silk-screen process.

Figure 2:
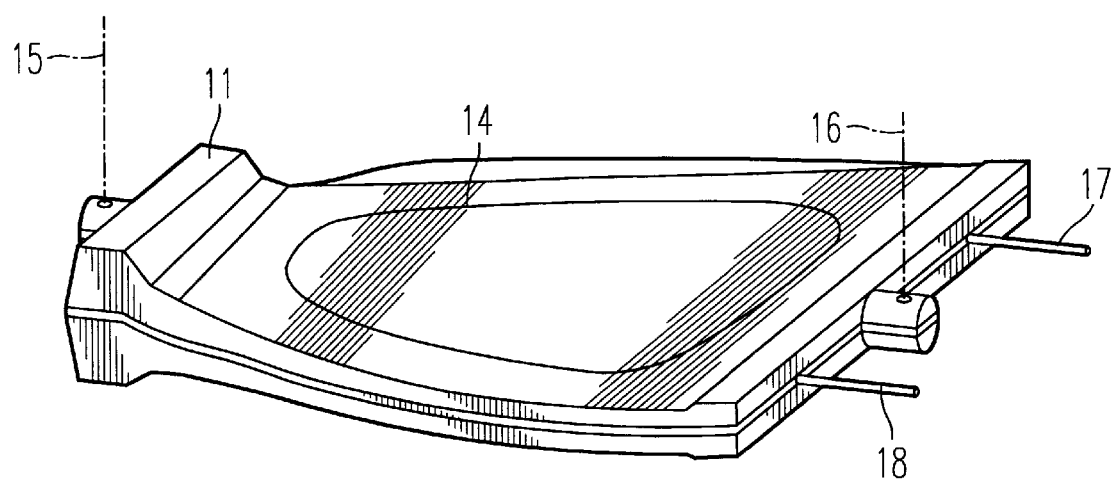
FIG. 2 is a perspective view of the blade parts shown in FIG. 1 after they have been assembled and before the diffusion welding step.

An assembly 14 is then formed by stacking the parts 11, 12 and 13 with the aid of two centering pins or studs or the like 15, 16 as shown in FIG. 2, and the assembly is then welded peripherally in a neutral atmosphere. Before complete closure of the assembly by the peripheral welding, one or more tubes, such as indicated at 17 and 18, are inserted to provide communication with the interior regions coated with the anti-diffusion material. The assembly 14 is then ready for diffusion welding, which is performed at a welding temperature above 880° C. in the case of a type TA6V titanium alloy blade.

However, before the welding step the method in accordance with the invention involves a known preheating treatment of the assembly to remove the organic binders from the anti-diffusion material in order to prevent any contamination of the contacting surfaces during subsequent high-temperature operations, followed by an additional step to prevent migration of the anti-diffusion material after the binders have been removed.

The volatile elements of the anti-diffusion coatings are broken down and removed by thermal degradation at a temperature between 200 and 400° C. for several hours while an inert gas, such as argon, flows through the interior of the assembly 14 at a rate of 1 to 5 liters per minute. The argon flow is stopped upon completion of the degradation and complete removal of the gases evolved by the breakdown of the binders of the anti-diffusion material.

The additional step is then carried out as a continuation of the previous treatment and without moving the blade assembly 14 from the oven. Firstly, the interior of the assembly 14 is exhausted and the temperature is increased progressively. In this embodiment the parts of the assembly are made of a TA6V titanium alloy and the peak temperature is 925° C. and the rate of temperature increase is from 5 to 35° C. per minute, depending on the thickness of the assembly. For TA6V or TAD4E type titanium alloys, depending upon the definition of the parts, the peak temperature is between 900 and 940° C. Once the required temperature has been reached a vacuum between 1 Pa and $10^{-4}$ Pa is maintained inside the assembly 14, and a pressure between $10^5$ Pa and $5 \times 10^5$ is applied around the assembly 14 in the oven enclosure. These temperature and pressure conditions are maintained for 1 hour. At the end of this step, and before carrying out the actual isostatic pressure diffusion welding of the assembly 14, the outer skins 11, 13 have collapsed on the central part 12 so that the particles of the anti-diffusion material are compacted and the facing areas which are not coated with the anti-diffusion material are prewelded or prestuck.

Conveniently, the oven enclosure containing the assembly 14 may be exhausted simultaneously with the interior of the assembly 14.

We claim:

1. A method of manufacturing a hollow blade for a turbomachine, especially a large-chord blade for a fan rotor, from a plurality of substantially planar parts, said method comprising the steps:

a) using CADCAM and digital simulation techniques to determine a flat form of the parts of the blade from a definition of the blade to be produced;

b) die-forging said parts in a press;

c) machining said parts;

d) depositing an anti-diffusion material having a binder to form diffusion barriers on at least one of said parts in a predefined pattern;

e) assembling said parts to form an assembly;

f) placing said assembly in an open enclosure and subjecting said assembly to a preheating treatment to degrade and completely remove the binder from the anti-diffusion material forming said diffusion barriers;

g) evacuating, and without moving said assembly after degradation and removal of the binder, an interior portion of said assembly and simultaneously progressively increasing the temperature at a rate V to a value T adapted to produce a permanent plastic deformation of said primary parts of said assembly, and maintaining the interior of said assembly evacuated at the temperature T while applying an isostatic pressure to an exterior portion of said assembly so as to achieve compacting of the anti-diffusion material and prewelding of facing areas which are not coated with the anti-diffusion material;

h) hot diffusion welding the assembly under isostatic pressure;

i) hot shaping the welded assembly in order to elongate the fibers;

j) hot forming a feed duct followed by unsticking of the primary parts in the areas coated with said anti-diffusion material;

k) pressurized gas inflation and superplastic forming of said assembly; and l) final machining the assembly.

2. A method according to claim 1 which comprises, in step (g), the step of maintaining the interior of said assembly at a vacuum between 1 Pa and $10^{-4}$ Pa while an isostatic pressure between $10^5$ Pa and $5 \times 10^5$ Pa is applied to the exterior of said assembly, such temperature and pressure conditions being maintained for 1 hour.

3. A method according to claim 1 which comprises, in step (g), simultaneously evacuating the oven enclosure containing said assembly and the interior of said assembly.

4. A method according to claim 1 wherein said assembly is made of a TA6V or TAD4E type titanium alloy, and in step (g) said progressive increase of temperature occurs at a rate V of from 5° C. to 35° C. per minute up to a maximum temperature T between 900° C. and 940° C.

* * * * *